US008591860B2

(12) United States Patent
Kawakami et al.

(10) Patent No.: US 8,591,860 B2
(45) Date of Patent: Nov. 26, 2013

(54) METHOD FOR MANUFACTURING A LITHIUM COMPLEX METAL OXIDE

(75) Inventors: Yoshihiro Kawakami, Niihama (JP); Ryuji Matsushita, Niihama (JP); Satoshi Shimano, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 13/519,163

(22) PCT Filed: Dec. 24, 2010

(86) PCT No.: PCT/JP2010/073876
§ 371 (c)(1),
(2), (4) Date: Jun. 26, 2012

(87) PCT Pub. No.: WO2011/081216
PCT Pub. Date: Jul. 7, 2011

(65) Prior Publication Data
US 2012/0301390 A1 Nov. 29, 2012

(30) Foreign Application Priority Data

Dec. 28, 2009 (JP) ................................ 2009-298534
Jul. 30, 2010 (JP) ................................ 2010-172602

(51) Int. Cl.
*C01D 1/00* (2006.01)
(52) U.S. Cl.
USPC ................... 423/594.2; 423/594.4; 429/231.5
(58) Field of Classification Search
USPC ................. 423/49, 61, 71, 138, 179.5, 594.2, 423/594.4; 429/231.95
See application file for complete search history.

(56) References Cited

U.S. PATENT DOCUMENTS

| | | | | |
|---|---|---|---|---|
| 4,567,031 A | * | 1/1986 | Riley | .......................... 423/594.2 |
| 2010/0248032 A1 | | 9/2010 | Pitteloud et al. | |
| 2012/0244413 A1 | * | 9/2012 | Shimano et al. | ............... 429/144 |

FOREIGN PATENT DOCUMENTS

| | | |
|---|---|---|
| JP | 5-182667 A | 7/1993 |
| JP | 05-290851 A | 11/1993 |
| JP | 2000-058053 A | 2/2000 |
| JP | 2001-041658 A | 2/2001 |
| JP | 2001-85009 A | 3/2001 |
| JP | 2006-1781 A | 1/2006 |
| JP | 2006-134852 A | 5/2006 |
| WO | 2009/041722 A1 | 4/2009 |

OTHER PUBLICATIONS

Machine-generated English translation of JP 05-182667 published Jul. 23, 1993 to Sony Corp.
Machine-generated English translation of JP 2001-085009 published Mar. 30, 2001 to Sony Corp.
Machine-generated English translation of JP 2006-134852 published May 25, 2006 to Han Kyoo-Sun and Digital-Tech. Co., Ltd.
Machine-generated English translation of JP 2006-001781 published Jan. 5, 2006 to Mitsui Mining & Smelting Co., Ltd.
Explanation of Circumstances Concerning Accelerated Examination filed in Japanese Patent Appln. No. 2010-288311 on Aug. 24, 2011 with English translation.
Japanese Office Action issued Oct. 25, 2011 in Japanese Patent Appln. No. 2010-288311 with English translation.

* cited by examiner

*Primary Examiner* — Steven Bos
(74) *Attorney, Agent, or Firm* — Sughrue Mion, PLLC

(57) ABSTRACT

A method for producing a lithium mixed metal oxide, which includes mixing a lithium compound, metallic Ni or a compound thereof, and one or more transition metals selected from the group consisting of Mn, Co, Ti, Cr and Fe or a compound thereof; and calcining the obtained raw material mixture under an atmosphere of the concentration of carbon dioxide of from 1% by volume to 15% by volume at 630° C. or higher.

7 Claims, No Drawings

METHOD FOR MANUFACTURING A LITHIUM COMPLEX METAL OXIDE

CROSS REFERENCE TO RELATED APPLICATIONS

This application is a National Stage of International Application No. PCT/JP2010/073876 filed Dec. 24, 2010, claiming priority based on Japanese Patent Application Nos. 2009-298534 filed Dec. 28, 2009, and 2010-172602 filed Jul. 30, 2010, the contents of all of which are incorporated herein by reference in their entirety.

TECHNICAL FIELD

The present invention relates to a method for producing a lithium mixed metal oxide.

BACKGROUND ART

A lithium mixed metal oxide is used as a positive electrode active material in nonaqueous electrolyte secondary batteries, such as a lithium secondary battery. The lithium secondary battery has already been put into practical use as a power source for portable telephones, notebook-sized personal computers and the like, and also an attempt is made to use the battery in medium and large size applications, such as applications of use for automobiles and electric power storages.

A mixed oxide of lithium and a cobalt-based oxide has hitherto been used as a positive electrode active material of the lithium secondary battery. However, use of oxides of transition metals other than cobalt, such as a nickel-based oxide and a manganese-based oxide has been studied from the viewpoint of reserves and costs of cobalt. For example, JP5-290851A discloses a method for producing a lithium-nickel mixed oxide in which a nickel compound and a lithium compound are mixed, and then heat-treated under an air atmosphere at 600° C. for 20 hours.

Lithium hydroxide is mainly used as a lithium raw material for a lithium mixed metal oxide. However, lithium hydroxide is likely to react with carbon dioxide in the air to form lithium carbonate ($Li_2CO_3$). Since lithium carbonate has low reactivity with a transition metal raw material, the formed lithium mixed metal oxide may have a non-uniform composition.

In order to avoid the reaction of lithium hydroxide with carbon dioxide in the atmosphere, in a conventional method for producing a lithium mixed metal oxide, pure oxygen or synthetic air containing no carbon dioxide is used, or calcination is carried out under an air atmosphere where the content of a carbon dioxide gas is about 0.01% by volume or less (see, for example, JP2000-58053A).

As mentioned above, in order to sufficiently react a lithium raw material in a conventional method for producing a lithium mixed metal oxide, it is necessary that an atmosphere controllable calcination furnace is used, or pure oxygen or synthetic air containing no carbon dioxide is used, or air, from which carbon dioxide has been removed by providing a special facility, is used, and thus leading to a factor of high costs.

In the case of producing a large amount of the lithium mixed metal oxide whose demands as a positive electrode active material for a nonaqueous electrolyte secondary battery are rapidly increasing, it is desired to use, as a calcination furnace for obtaining a lithium mixed metal oxide, a versatile gas furnace using flame of a combustion gas such as propane as a heat source from the viewpoint of an improvement in mass productivity of the lithium mixed metal oxide and cost reduction. However, since such a gas furnace undergoes heating by combustion of a hydrocarbon gas such as propane, high concentration of $CO_2$ (usually 10 to 15% by volume, or about 5 to 10% by volume even in the case of providing $CO_2$ removal means) is contained inside the furnace. Therefore, when calcination is performed under a conventional temperature condition using such a gas furnace, as mentioned above, a lithium compound (for example, lithium hydroxide) easily reacts with carbon dioxide to form lithium carbonate having low reactivity. As a result, an insufficiently reacted lithium mixed metal oxide is synthesized, and thus sufficient battery performance can not be obtained even if a nonaqueous electrolyte secondary battery is produced using the lithium mixed metal oxide as a positive electrode active material.

Under these circumstances, an object of the present invention is to provide a method capable of stably producing a lithium mixed metal oxide which can be used as a positive electrode active material of a nonaqueous electrolyte secondary battery even under a calcination atmosphere containing higher concentration of carbon dioxide than that in the air.

DISCLOSURE OF THE INVENTION

The present invention relates to the following <1> to <8>.
<1> A method for producing a lithium mixed metal oxide, the method comprising mixing a lithium compound, metallic Ni or a compound thereof, and one or more transition metals selected from the group consisting of Mn, Co, Ti, Cr and Fe or a compound thereof; and calcining the obtained raw material mixture under an atmosphere of the concentration of carbon dioxide of from 1% by volume to 15% by volume at 630° C. or higher.
<2> The method for producing a lithium mixed metal oxide according to <1>, wherein the concentration of oxygen in the calcination is from 1% by volume to 50% by volume.
<3> The method for producing a lithium mixed metal oxide according to <1> or <2>, wherein the calcination time at 630° C. or higher is from 0.5 hours to 24 hours.
<4> The method for producing a lithium mixed metal oxide according to any one of <1> to <3>, further comprising a retention step at a temperature which is 30° C. or more lower than a calcination temperature and is 600° C. or higher.
<5> The method for producing a lithium mixed metal oxide according to any one of <1> to <4>, wherein the transition metal is Mn and/or Fe.
<6> The method for producing a lithium mixed metal oxide according to any one of <1> to <5>, wherein calcination is performed by a gas furnace using flame of a combustion gas as a heat source.
<7> The method for producing a lithium mixed metal oxide according to any one of <1> to <6>, wherein the raw material mixture contains a reaction accelerator made of one or more compounds selected from the group consisting of a carbonate, a sulfate and a chloride of one of more elements selected from the group consisting of Na, K, Rb, Cs, Ca, Mg, Sr and Ba.
<8> The method for producing a lithium mixed metal oxide according to <7>, wherein the transition metal is Mn and Fe, and the reaction accelerator is a carbonate.

According to the present invention, it is possible to stably produce a lithium mixed metal oxide which can be used as a positive electrode active material of a nonaqueous electrolyte secondary battery even under a calcination atmosphere containing higher concentration of carbon dioxide than that in the air. Therefore, it is possible to employ an inexpensive gas calcination furnace using flame of a combustion gas such as propane as a heat source in the production of a lithium mixed metal oxide. Accordingly, it is possible to produce a positive electrode active material for a nonaqueous electrolyte secondary battery at low costs in a large amount.

BEST NODES FOR CARRYING OUT THE INVENTION

The present invention is directed to a method for producing a lithium mixed metal oxide, which includes mixing a lithium compound, metallic Ni or a compound thereof, and one or more transition metals selected from the group consisting of Mn, Co, Ti, Cr and Fe or a compound thereof; and calcining the obtained raw material mixture under an atmosphere of the concentration of carbon dioxide of from 1% by volume to 15% by volume at 630° C. or higher (hereinafter sometimes referred to as a "method of the present invention").

One of features of the method of the present invention lies in that the calcination temperature is set to 630° C. or higher. By setting the calcination temperature to 630° C. or higher, the reactivity can be improved and also formation of metal oxides containing no lithium as by-products, for example, $NiO$, $MnO_2$, and $Mn_3O_4$ is suppressed even at high concentration of carbon dioxide (of from 1% by volume to 15% by volume), and thus a desired lithium mixed metal oxide can be obtained. From the viewpoint of more enhancing the reactivity while suppressing the formation of by-products, the calcination temperature is preferably 650° C. or higher, more preferably 750° C. or higher, and still more preferably 830° C. or higher.

The method of the present invention will be described in more detail below.

Examples of the lithium compound include one or more compounds selected from the group consisting of lithium hydroxide, lithium oxide, lithium chloride, lithium nitrate, lithium sulfate and lithium carbonate.

Among these lithium compounds, lithium hydroxide and lithium carbonate, which are low-cost and do not generate a corrosive gas during heating, are preferably used. Lithium sulfate can be preferably used since it serves as an oxidizing agent and has a reaction acceleration effect in the reaction during calcination.

Examples of metallic Ni or a compound thereof (hereinafter sometimes referred to as a "Ni compound") include a metallic Ni simple substance, oxides, hydroxides, oxyhydroxides, carbonates, sulfates, nitrates, acetates, halides, ammonium salts, oxalates, and alkoxides.

Examples of one or more transition metals selected from the group consisting of Mn, Co, Ti, Cr and Fe or a compound thereof (hereinafter sometimes referred to as the "other transition metal compound") include metal simple substances, oxides, hydroxides, oxyhydroxides, carbonates, sulfates, nitrates, acetates, halides, ammonium salts, oxalates, and alkoxides of the respective elements. Here, from the viewpoint of obtaining a high-capacity positive electrode active material, the transition metal in the other transition metal compound is preferably Mn and/or Fe.

The raw material mixture obtained by mixing a lithium compound, a Ni compound and the other transition metal compound (hereinafter sometimes simply referred to as a "raw material mixture") may be obtained by dry mixing, wet mixing, liquid phase mixing, or any mixing method as a combination thereof, and the mixing order is not particularly limited. Not only a lithium compound, a Ni compound and the other transition metal compound as raw materials may be simply mixed physically, but also a reaction product, which is obtained by mixing part of these raw materials and then reacting the mixture, may be mixed with the remaining raw materials.

Here, from the viewpoint of the ability to synthesize a more uniform lithium mixed metal oxide by enhancing the reactivity in calcination, a preferred method is a method in which a mixed transition metal compound is first synthesized by mixing a Ni compound with the other transition metal compound, and then the mixed transition metal compound is mixed with a lithium compound. Mixing of the mixed transition metal compound with the lithium compound may be performed by any of dry mixing, wet mixing, and liquid phase mixing, and liquid phase mixing is preferable.

There is no particular limitation on the mixed transition metal compound obtained from the Ni compound and the other transition metal compound, and the mixed transition metal compound is preferably a mixed metal hydroxide produced by subjecting a coprecipitate slurry, which is obtained by bringing an aqueous solution containing the respective elements into contact with an alkali (liquid phase mixing), to solid-liquid separation, followed by drying.

A typical method for producing the mixed transition metal compound will be specifically described by way of the case of producing a mixed metal hydroxide containing Ni, Mn and Fe from a Ni compound and a transition metal compound containing Mn and Fe as an example.

It is possible to preferably use, as the aqueous solution containing Ni, Mn and Fe, a compound which can be dissolved in water to form an aqueous solution, among the above-mentioned raw material compounds. In the case it is difficult for the metal simple substance or compound to be dissolved in water, it is possible to use an aqueous solution prepared by dissolving the above-mentioned respective elements in an aqueous solution containing hydrochloric acid, sulfuric acid, nitric acid, acetic acid or the like. Among these aqueous solutions, an aqueous solution obtained using the respective chlorides and dissolving chlorides of Ni, Mn and Fe in water is preferable. The chloride of Fe is preferably a chloride of divalent Fe.

Examples of the alkali include one or more compounds selected from the group consisting of LiOH (lithium hydroxide), NaOH (sodium hydroxide), KOH (potassium hydroxide), $Li_2CO_3$ (lithium carbonate), $Na_2CO_3$ (sodium carbonate), $K_2CO_3$ (potassium carbonate) and $(NN_4)_2CO_3$ (ammonium carbonate), and an aqueous solution of the above-mentioned alkali is preferably used. Examples of the aqueous alkali solution also include ammonia water. The concentration of the alkali in the aqueous alkali solution is usually about 0.5 to 10 M, and preferably about 1 to 8 M. It is preferable from the viewpoint of the production costs to use NaOH or KOH as the alkali to be used. Two or more kinds of the above-mentioned alkalis may be used in combination.

Water to be used as a solvent of the aqueous solution containing Ni, Mn and Fe, and the aqueous alkali solution is preferably pure water and/or ion-exchange water. As far as the effects of the present invention are not impaired, the aqueous solution may contain an organic solvent other than water, such as alcohol, or a pH adjustor or the like.

A coprecipitate slurry, which contains a mixed metal hydroxide containing Ni, Mn and Fe, is obtained by bringing an aqueous solution containing Ni, Mn and Fe into contact with an alkali (liquid phase mixing). The "coprecipitate slurry" is a slurry, most of which comprises a coprecipitate of a mixed metal hydroxide containing Mn, Ni and Fe, and water. The slurry may contain raw materials remaining during the process of the preparation of the coprecipitate, by-produced salts (for example, KCl), additives, an organic solvent and the like, which may be removed by washing with pure water, an organic solvent or the like.

Examples of the contact (liquid phase mixing) method include a method in which an aqueous alkali solution is added to an aqueous solution containing Ni, Mn and Fe, followed by mixing, a method in which an aqueous solution containing Ni, Mn and Fe is added to an aqueous alkali solution, followed by mixing, and a method in which an aqueous solution containing Ni, Mn and Fe and an aqueous alkali solution are added to water, followed by mixing. It is preferable that these mixing procedures be accompanied by stirring. Among the above-mentioned contact (liquid phase mixing) methods, the method in which an aqueous solution containing Ni, Mn and Fe is added to an aqueous alkali solution, followed by mixing can be preferably used since the pH is controlled easily within a prescribed range in this method. In this case, with the progress of the addition of an aqueous solution containing Ni, Mn and Fe to an aqueous alkali solution and mixing thereof, the pH of the mixed liquid tends to become lower, and it is recommended to add an aqueous solution containing Ni, Mn and Fe while adjusting the pH to 9 or higher, preferably 10 or higher. Furthermore, it is preferable to perform contact (liquid phase mixing) of an aqueous solution containing Ni, Mn and Fe and an aqueous alkali solution while retaining either one or both of the solutions at a temperature of 40° C. to 80° C., since a coprecipitate having a more uniform composition can be obtained.

For obtaining a nonaqueous electrolyte secondary battery having enhanced capacity, it is preferable that the ratio of the amount (mol) of Mn to the total amount (mol) of Ni, Mn and Fe be from 0.1 to 0.7 in the aqueous solution containing Ni, Mn and Fe.

Further, for obtaining a nonaqueous electrolyte secondary battery having enhanced capacity, it is preferable that the ratio of the amount (mol) of Fe to the total amount (mol) of Ni, Mn and Fe be from 0.01 to 0.5 in the aqueous solution containing Ni, Mn and Fe.

Next, a dry matter of a mixed metal hydroxide containing Mn, Ni and Fe (hereinafter sometimes simply referred to as a "dry matter") can be obtained by solid-liquid separation of the coprecipitate slurry and then drying.

Although drying is usually carried out by a heat treatment, it may also be carried out by air blast drying, vacuum drying and the like. It is possible to use, as an atmosphere of drying, atmospheric air, oxygen, nitrogen, argon or a mixed gas thereof, and atmospheric air is preferable. In the case drying is performed by the heat treatment, it is carried out usually at 50° C. to 300° C., and preferably at about 100° C. to 200° C.

The BET specific surface area of the dry matter is usually about from 10 $m^2/g$ to 100 $m^2/g$. The BET specific surface area of the dry matter can be controlled by the drying temperature. The BET specific surface area of the dry matter is preferably 20 $m^2/g$ or more, and more preferably 30 $m^2/g$ or more, for accelerating the reactivity during the calcination described later. From the viewpoint of operability, the BET specific surface area of the dry matter is preferably 90 $m^2/g$ or less, and more preferably 85 $m^2/g$ or less. The dry matter usually comprises a mixture of primary particles having a particle diameter of from 0.001 μm to 0.1 μm and secondary particles having a particle diameter of from 1 μm to 100 μm formed by aggregation of primary particles. The particle diameter of primary particles and secondary particles can be measured by observation using a scanning electron microscope (hereinafter sometimes referred to as a SEM). The particle diameter of secondary particles is preferably from 1 μm to 50 μm, and more preferably from 1 μm to 30 μm.

Next, the dry matter of the mixed metal hydroxide is mixed with the lithium compound in order to produce a raw material mixture.

Mixing of the dry matter with the lithium compound may be carried out by either dry mixing or wet mixing, and from the viewpoint of convenience, dry mixing is preferable. Examples of the mixing apparatus include a stirring mixer, a V-shaped mixer, a W-shaped mixer, a ribbon mixer, a drum mixer, and a ball mill.

The calcination step in the method of the present invention will be described below.

The above-mentioned raw material mixture obtained by mixing a lithium compound, a Ni compound and the other transition metal compound is calcined at 630° C. or higher under an atmosphere where the concentration of carbon dioxide is from 1% by volume to 15% by volume.

Here, in the calcination at 630° C. or higher, it is only required that the temperature be retained at 630° C. or higher and the temperature is not necessary a constant retention temperature. From the viewpoint of making a lithium mixed metal oxide as a calcined product homogeneous, the calcination temperature is preferably a constant temperature. From the viewpoint of acceleration of the reaction, the calcination temperature is preferably 650° C. or higher, more preferably 750° C. or higher, and still more preferably 830° C. or higher. There is no particular limitation on the upper limit temperature, and the upper limit temperature is usually 1,100° C. or lower, and preferably 1,000° C. or lower, since the raw material mixture is easy to sinter when the calcination is performed at high temperature.

The retention time at a temperature of 630° C. or higher is preferably from 0.5 hours to 24 hours. Excessive calcination can be prevented by performing calcination within the above-mentioned time range, and thus it is possible to obtain a lithium mixed metal oxide which would serve as a positive electrode active material for a nonaqueous electrolyte secondary battery in which high performance is stably retained. When the retention time is less than 0.5 hours, the reaction of the lithium compound with the transition metal mixed compound may sometimes become insufficient. In contrast, when the retention time is more than 24 hours, grain growth of the lithium mixed metal oxide may sometimes occur, resulting in deterioration of performance. From the viewpoint of suppressing grain growth due to excessive calcination, the retention time is more preferably 12 hours or less, and still more preferably 8 hours or less.

Here, the concentration of carbon dioxide is preferably 1 to 10% by volume. As mentioned above, in the present invention, it is also possible to produce a lithium mixed metal oxide which can stand use as a positive electrode active material for a nonaqueous electrolyte secondary battery even in a region where the concentration of carbon dioxide is 1 to 15% by volume. However, by adjusting the concentration of carbon dioxide within a range of 1 to 10% by volume, the formation of by-products can be decreased to obtain a lithium mixed metal oxide with higher uniformity.

It is possible to control the temperature of a calcination furnace to be used in the production of a lithium mixed metal oxide, and the furnace may be a furnace capable of controlling the concentration of carbon dioxide of an inside atmosphere within a range of 1 to 15% by volume, and examples thereof include an electric furnace, and a gas furnace using flame of a combustion gas as a heat source.

Here, from the viewpoint of productivity of the lithium mixed metal oxide, a gas furnace is preferably used as the calcination furnace. The gas furnace can be suitably used in the method of the present invention since the concentration of carbon dioxide becomes 5 to 10% by volume under usual operating conditions.

Examples of the gas furnace include a batch-type furnace and a continuous-type furnace. Examples of the continuous-type furnace include a belt furnace, a rotary kiln, and a roller hearth kiln. From the viewpoint of productivity, the furnace is preferably a tunnel kiln in which calcination is performed by moving a kiln car including calcination vessels stacked in a multiple stages in the furnace. Examples of gaseous species to be used as a fuel gas of a gas furnace include hydrogen, methane, ethane, propane, butane, acetylene, and a mixture of these gases. It is also possible to use a liquefied petroleum gas (LPG) having superior transportability, which contains hydrocarbons such as butane and propane as main components, and is easily liquefied by compression. Among these gaseous species, a liquefied petroleum gas (LPG) is preferable since it generates large calorie during combustion and is also comparatively inexpensive.

In the calcination by the gas furnace, it is only required that the calcination temperature be retained at 630° C. or higher and the temperature is not necessarily a constant retention temperature. From the viewpoint of making a lithium mixed metal oxide as a calcined product homogeneous, the calcination temperature is preferably a constant temperature. From the viewpoint of acceleration of the reaction, the calcination temperature is preferably 650° C. or higher, more preferably 750° C. or higher, and still more preferably 830° C. or higher. There is no particular limitation on the upper limit temperature, and the upper limit temperature is usually 1,100° C. or lower, and preferably 1,000° C. or lower, since the raw material mixture is easy to sinter when calcination is performed at high, temperature.

The retention time is preferably from 0.5 hours to 24 hours. Excessive calcination can be prevented by performing calcination within the above-mentioned time range, and thus it is possible to obtain a lithium mixed metal oxide which would serve as a positive electrode active material for a nonaqueous electrolyte secondary battery in which high performance is stably retained. When the retention time is less than 0.5 hours, the reaction of the lithium compound with the transition metal mixed compound may sometimes become insufficient. In contrast, when the retention time is more than 24 hours, grain growth of the lithium mixed metal oxide may sometimes occur, resulting in deterioration of performance. From the viewpoint of suppressing grain growth due to excessive calcination, the retention time is more preferably 12 hours or less, and still more preferably 8 hours or less.

There is no particular limitation on the gas component other than carbon dioxide in the atmosphere of the calcination furnace as long as it is a gas which does not form by-products as a result of the reaction with raw materials and product of the present invention.

In the case of synthesizing a lithium mixed metal oxide, in order to obtain a lithium mixed metal oxide which causes less oxygen defects and has high crystallinity, an atmosphere gas preferably contains 1 to 50% by volume of oxygen, and air is usually used. When the atmosphere gas contains 1 to 50% by volume of oxygen, the reaction sufficiently proceeds and thus a lithium mixed metal oxide having high crystallinity can be obtained. Since moisture (steam) in the air reacts with the lithium mixed metal oxide and raw materials thereof, the atmosphere gas is preferably subjected to a dehydration treatment.

From the viewpoint of more improving crystallinity and uniformity of the lithium mixed metal oxide, the method of the present invention preferably includes, in addition to the above-mentioned step of calcination at 630° C. or higher under the atmosphere where the concentration of carbon dioxide is 1 to 15% by volume, a retention step at a temperature which is 30° C. or more lower than the calcination temperature and is 600° C. or higher. The retention temperature in this retention step is preferably a constant temperature.

The retention step at a temperature which is 30° C. or more lower than the calcination temperature and is 600° C. or higher may be provided either before or after the step of calcining the raw material mixture at 630° C. or higher, and the step is preferably provided both before and after the calcination step.

In the method of the present invention, the atmosphere gas at lower than 600° C. is not limited to an atmosphere gas containing 1 to 15% by volume of carbon dioxide, and may be an oxidizing gas such as air containing oxygen, or an inert gas such as nitrogen or argon. Specifically, there is exemplified the case where heating by flame is stopped and then air is circulated in the case of a gas furnace.

At the time of calcination, the raw material mixture may contain a reaction accelerator.

Specific examples of the reaction accelerator include chlorides such as NaCl, KCl, RbCl, CsCl, $CaCl_2$, $MgCl_2$, $SrCl_2$, $BaCl_2$ and $NH_4Cl$; carbonates such as $Na_2CO_3$, $K_2CO_3$, $Rb_2CO_3$, $Cs_2CO_3$, $CaCO_3$, $MgCO_3$, $SrCO_3$ and $BaCO_3$; sulfates such as $K_2SO_4$ and $Na_2SO_4$; and fluorides such as NaF, KF and $NH_4F$. Among these reaction accelerators, chlorides, carbonates or sulfates of one of more elements selected from the group consisting of Na, K, Rb, Cs, Ca, Mg, Sr and Ba are preferable, and the carbonates or the sulfates are more preferable. In the case the transition metals of the other transition metal compound contained in the raw material mixture are Mn and Fe, the reaction accelerators are particularly preferably carbonates.

Suitable examples of the reaction accelerator include NaCl, KCl, $Na_2CO_3$, $K_2CO_3$, $Na_2SO_4$ and $K_2SO_4$, and $Na_2CO_3$, $K_2CO_3$, $Na_2SO_4$ and $K_2SO_4$ are more preferable, and $K_2CO_3$ is particularly preferable. It is also possible to use two or more kinds of reaction accelerators in combination.

When the raw material mixture contains the reaction accelerator, it may be sometimes possible to improve the reactivity during calcination of the raw material mixture and to adjust the BET specific surface area of the obtained lithium mixed metal oxide.

There is no particular limitation on the method of adding the reaction accelerator to the raw material mixture. When the mixed transition metal compound is synthesized by liquid phase mixing at the time of producing the raw material mixture as mentioned above, the reaction accelerator may be added at the time of mixing a dry matter with a lithium compound, followed by mixing.

In the case by-produced salts (for example, KCl, and $K_2SO_4$) formed during liquid phase mixing remain in a mixed transition metal compound, these by-produced salts may be used as the reaction accelerator. In this case, the reaction accelerator may be added to make up for the deficit at the time of mixing a dry matter with a lithium compound.

The reaction accelerator may remain in a lithium mixed metal oxide, or may be removed by washing, distillation or the like.

Regarding the mixing ratio of the reaction accelerator to the raw material mixture, the amount of the reaction accelerator is preferably from 0.1 parts by weight to 100 parts by weight, and more preferably from 1.0 part by weight to 40 parts by weight, based on 100 parts by weight of the raw material mixture.

After the above-mentioned calcination, the obtained lithium mixed metal oxide may be pulverized using a ball mill, a jet mill or the like. The BET specific surface area of the lithium mixed metal oxide may be sometimes controlled by pulverization. Pulverization and calcination may be repeated twice or more. The lithium mixed metal oxide can also be washed or classified, if necessary.

The lithium mixed metal oxide obtained by the method of the present invention (hereinafter sometimes referred to as a "lithium mixed metal oxide of the present invention") would serve as a positive electrode active material which is useful for a nonaqueous electrolyte secondary battery having superior charge and discharge characteristics.

The lithium mixed metal oxide of the present invention usually comprises primary particles having an average particle diameter of from 0.05 μm to 1 μm. The lithium mixed metal oxide of the present invention comprises a mixture of primary particles and secondary particles having an average particle diameter of from 0.1 μm to 100 μm formed by aggregation of primary particles. The average particle diameter of primary particles and secondary particles can be measured by observation with a SEM. For further enhancing the effect of the present invention, the size of secondary particles is preferably from 0.1 μm to 50 μm, and more preferably from 0.1 μm to 10 μm.

For further enhancing the effect of the present invention, the lithium mixed metal oxide of the present invention preferably has a crystalline structure of α-NaFeO$_2$-type, that is, a crystalline structure belonging to the R-3m space group. The crystalline structure can be identified from a powder X-ray diffraction pattern obtained by powder X-ray diffractometry using CuKα as a radiation source, for the lithium mixed metal oxide.

Regarding the composition of Li in the lithium mixed metal oxide of the present invention, the ratio of the amount (mol) of Li to the total amount (mol) of the transition metals M such as Ni, Mn and Fe is usually from 0.5 to 1.5, and from the viewpoint of further enhancing capacity maintenance ratio, it is preferably from 0.95 to 1.5 and more preferably from 1.0 to 1.4. In the following formula (A), y is usually from 0.5 to 1.5, preferably from 0.95 to 1.5, and more preferably from 1.0 to 1.4.

$$Li_y(Ni_{1-x}M_x)O_2 \quad (A)$$

wherein M represents one or more transition metals selected from the group consisting of Mn, Co, Ti, Cr and Fe, and x is larger than 0 and is smaller than 1.

As far as the effects of the present invention are not impaired, part of Li, Ni, Mn, and Fe in the lithium mixed metal oxide of the present invention may be substituted with other elements. Here, the other elements include elements such as B, Al, Ga, In, Si, Ge, Sn, Mg, Sc, Y, Zr, Hf, Nb, Ta, Mo, W, Tc, Ru, Rh, Ir, Pd, Cu, Ag and Zn.

Onto the surface of particles constituting the lithium mixed metal oxide of the present invention, a compound different from the lithium mixed metal oxide may be adhered, as far as the effects of the present invention are not impaired. Examples of the compound include compounds containing one or more elements selected from the group consisting of B, Al, Ga, In, Si, Ge, Sn, Mg and transition metal elements, preferably compounds containing one or more elements selected from the group consisting of B, Al, Mg, Ga, In and Sn, and more preferably compounds of Al. Specific examples of the compound include oxides, hydroxides, oxyhydroxides, carbonates, nitrates and organic acid salts of the above-mentioned elements. The oxides, the hydroxides and the oxyhydroxides are preferable. These compounds may be mixed. Among these compounds, alumina is a particularly preferable compound. Heating may be carried out after adhesion.

The positive electrode active material for a nonaqueous electrolyte secondary battery made of the lithium mixed metal oxide of the present invention is suitable for a nonaqueous electrolyte secondary battery. In the present invention, the positive electrode active material for a nonaqueous electrolyte secondary battery may be made of the lithium mixed metal oxide of the present invention as a main component.

Using the positive electrode active material for a nonaqueous electrolyte secondary battery, a positive electrode for a nonaqueous electrolyte secondary battery can be produced, for example, as mentioned below.

The positive electrode for a nonaqueous electrolyte secondary battery is produced by allowing a positive electrode mixture containing a positive electrode active material, an electrically conductive material and a binder to be supported on a positive electrode current collector. As the above-mentioned electrically conductive material, a carbonaceous material can be used, and examples of the carbonaceous material include a graphite powder, carbon black (for example, acetylene black), and a filamentous carbon material. Carbon black (for example, acetylene black) can be added in a small amount into a positive electrode mixture to enhance the electric conductivity in a positive electrode and to improve charge and discharge efficiency and rate property since carbon black comprises fine particles and has a large surface area. However, when carbon black is added in too large an amount, an adhesion property by a binder between a positive electrode mixture and a positive electrode current collector is lowered, leading to a cause for increase in internal resistance. Usually, the proportion of an electrically conductive material in a positive electrode mixture is from 5 parts by weight to 20 parts by weight based on 100 parts by weight of the positive electrode active material. In the case of using a filamentous carbon material such as a graphitized carbon fiber or a carbon nanotube as the electrically conductive material, it is also possible to decrease the proportion of the electrically conductive material.

As the above-mentioned binder, thermoplastic resins can be used, and specific examples thereof include fluorine resins such as polyvinylidene fluoride (hereinafter sometimes referred to as PVdF), polytetrafluoroethylene (hereinafter sometimes referred to as PTFE), ethylene tetrafluoride-propylene hexafluoride-vinylidene fluoride-based copolymer, propylene hexafluoride-vinylidene fluoride-based copolymer and ethylene tetrafluoride-perfluoro vinyl ether-based copolymer; and polyolefin resins such as polyethylene and polypropylene. Two or more kinds of these compounds may be used in admixture. Further, a positive electrode mixture superior in adhesion property with a positive electrode current collector can be obtained by using a fluorine resin and a polyolefin resin as the binder, and adding them so that the proportion of the fluorine resin with respect to the positive electrode mixture is 1 to 10% by weight and the proportion of the polyolefin resin with respect to the positive electrode mixture is 0.1 to 2% by weight.

As the above-mentioned positive electrode current collector, Al, Ni, stainless steel and the like can be used, and Al is preferable since it can be processed into a thin film easily and it is inexpensive. Examples of the method for allowing a positive electrode mixture to be supported on a positive electrode current collector include a method of pressure molding or a method of making a paste of a positive electrode mixture using an organic solvent or the like, and applying this to a positive electrode current collector and drying this, then, performing pressing and the like to attain fixation thereof. In the case of making a paste, a slurry made of a positive electrode active material, an electrically conductive material, a binder and an organic solvent is produced.

Examples of the organic solvent include amine-based solvents such as N,N-dimethylaminopropylamine and diethylenetriamine; ether-based solvents such as tetrahydrofuran; ketone-based solvents such as methyl ethyl ketone; ester-based solvents such as methyl acetate; and amide-based solvents such as dimethylacetamide and N-methyl-2-pyrrolidone.

Examples of the method of applying a positive electrode mixture to a positive electrode current collector include a slit die coating method, a screen coating method, a curtain coating method, a knife coating method, a gravure coating method and an electrostatic spray method. By the methods mentioned above, a positive electrode for a nonaqueous electrolyte secondary battery can be produced.

Using the above-mentioned positive electrode for a nonaqueous electrolyte secondary battery, a nonaqueous electrolyte secondary battery can be produced in the following manner. That is, a separator, a negative electrode and the above-mentioned positive electrode are laminated and wound to obtain an electrode group, which is then accommodated in a battery can, then, an electrolytic solution made of an organic solvent containing an electrolyte is impregnated thereinto, thus, a nonaqueous electrolyte secondary battery can be produced.

Examples of the shape of the above-mentioned electrode group include shapes revealing a cross section of circle, ellipse, rectangle or rounded rectangle when the electrode group is cut in a direction perpendicular to the axis of winding thereof. Examples of the shape of the battery include a paper shape, a coin shape, a cylinder shape and an angular shape.

The above-mentioned negative electrode may be an electrode capable of being doped and dedoped with lithium ions at a potential lower than that of a positive electrode, and mentioned are electrodes in which a negative electrode mixture containing a negative electrode material is supported on a negative electrode current collector, or electrodes made of a simple negative electrode material. Examples of the negative electrode material include a material capable of being doped and dedoped with lithium ions at a potential lower than that of a positive electrode, among carbonaceous materials, chalcogen compounds (oxides, sulfides, etc.), nitrides, metals or alloys. These negative electrode materials may be mixed and used.

The above-mentioned negative electrode materials will be exemplified below. Specific examples of the above-mentioned carbonaceous materials include graphites such as natural graphite and artificial graphite, cokes, carbon black, pyrolytic carbon, carbon fibers and organic polymer compound calcined bodies. Specific examples of the above-mentioned oxide include oxides of silicon represented by the formula $SiO_x$ (wherein x is a positive real number) such as $SiO_2$ and SiO, oxides of titanium represented by the formula $TiO_x$ (wherein x is a positive real number) such as $TiO_2$ and TiO, oxides of vanadium represented by the formula $VO_x$ (wherein x is a positive real number) such as $V_2O_5$ and $VO_2$, oxides of iron represented by the formula $FeO_x$ (wherein x is a positive real number) such as $Fe_3O_4$, $Fe_2O_3$ and FeO, oxides of tin represented by the formula $SnO_x$ (wherein x is a positive real number) such as $SnO_2$ and SnO, oxides of tungsten represented by the formula $WO_x$ (wherein x is a positive real number) such as $WO_3$ and $WO_2$, and mixed metal oxides containing lithium and titanium and/or vanadium such as $Li_4Ti_5O_{12}$ and $LiVO_2$ (for example, $Li_{1.1}V_{0.9}O_2$). Specific examples of the above-mentioned sulfide include sulfides of titanium represented by the formula $TiS_x$ (wherein x represents a positive real number) such as $Ti_2S_3$, $TiS_2$ and TiS, sulfides of vanadium represented by the formula $VS_x$ (wherein x is a positive real number) such as $V_3S_4$, $VS_2$ and VS, sulfides of iron represented by the formula $FeS_x$ (wherein x is a positive real number) such as $Fe_3S_4$, $FeS_2$ and FeS, sulfides of molybdenum represented by the formula $MoS_x$ (wherein x is a positive real number) such as $Mo_2S_3$ and $MoS_2$, sulfides of tin represented by the formula $SnS_x$ (wherein x represents a positive real number) such as $SnS_2$ and SnS, sulfides of tungsten represented by the formula $WS_x$ (wherein x is a positive real number) such as $WS_2$, sulfides of antimony represented by the formula $SbS_x$ (wherein x is a positive real number) such as $Sb_2S_3$, and sulfides of selenium represented by the formula $SeS_x$ (wherein x is a positive real number) such as $Se_5S_3$, $SeS_2$ and SeS. Specific examples of the above-mentioned nitride include lithium-containing nitrides such as $Li_3N$ and $Li_{3-x}A_xN$ (wherein A represents Ni and/or Co, and x is more than 0 and is less than 3). These carbonaceous materials, oxides, sulfides and nitrides may be used together, and may be either crystalline or amorphous. Further, these carbonaceous materials, oxides, sulfides and nitrides are, in most cases, supported on a negative electrode current collector, and used as an electrode.

Specific examples of the above-mentioned metal include lithium metals, silicon metals and tin metals. Specific examples of the above-mentioned alloy include lithium alloys such as Li—Al, Li—Ni and Li—Si, silicon alloys such as Si—Zn, tin alloys such as Sn—Mn, Sn—Co, Sn—Ni, Sn—Cu and Sn—La, and additionally, alloys such as $Cu_2Sb$ and $La_3Ni_2Sn_7$. These metals and alloys are, in most cases, used solely as an electrode (for example, used in the form of foil).

Among the above-mentioned negative electrode materials, carbonaceous materials containing graphites such as natural graphite and artificial graphite as a main component are preferably used from the viewpoint of high potential flatness, low average discharge potential, good cycle performance and the like. As the shape of the carbonaceous material, for example, any of flakes such as natural graphite, spheres such as mesocarbon microbeads, fibers such as graphitized carbon fiber, aggregates of fine powder and the like may be used.

The above-mentioned negative electrode mixture may contain a binder, if necessary. Examples of the binder include thermoplastic resins, and specific examples thereof include PVdF, thermoplastic polyimide, carboxymethylcellulose, polyethylene, and polypropylene.

Examples of the above-mentioned negative electrode current collector include Cu, Ni, and stainless steel, and from the viewpoint of difficulty of making an alloy with lithium and easiness of processing into a thin film, Cu may be advantageously used. As the method for allowing a negative electrode mixture to be supported on the negative electrode current collector, there are mentioned a method of pressure molding, a method of making a paste of a negative electrode mixture using a solvent and the like, applying this to a negative electrode current collector and drying this, then, performing pressing to attain press bonding thereof, and so forth, like the case of a positive electrode.

As the above-mentioned separator, for example, there can be used materials having a form of porous membrane, non-woven fabric, woven fabric or the like made of a material such as a polyolefin resin, e.g., polyethylene or polypropylene, a fluorine resin, or a nitrogen-containing aromatic polymer. Moreover, two or more kinds of the above-mentioned materials may be used to give a separator, or the above-mentioned materials may be laminated. As the separator, separators mentioned in, for example, JP2000-30686A and JP10-324758A are mentioned. It is advantageous that the thickness of the separator is thinner providing that mechanical strength is retained, from the viewpoint of an increase in the volumetric energy density of a battery and decrease in internal resistance thereof, and it is usually about 5 to 200 μm, and preferably about 5 to 40 μm.

The separator preferably has a porous film containing a thermoplastic resin. The nonaqueous electrolyte secondary battery usually preferably has a function by which, when an abnormal current flows in the battery because of short circuit between a positive electrode and a negative electrode or the like, the current is interrupted to block (shutdown) the flow of excessive current. Here, shutdown is carried out by obstructing micropores of a porous film of a separator when the usual use temperature is exceeded. It is preferable that after shutdown, even if the temperature in the battery increases to some degree, membrane destruction should not occur at this temperature and the shutdown state be retained. As this separator, a laminated film that has a heat resistant porous layer and a porous film laminated to each other is mentioned, and it becomes possible to further increase the heat resistance of a secondary battery in the present invention by using this film as a separator. Here, the heat resistant porous layer may be laminated on both surfaces of the porous film.

The above-mentioned laminated film that has a heat resistant porous layer and a porous film laminated to each other will be described below.

In the above-mentioned laminated film, the heat resistant porous layer is a layer having higher heat resistance than the porous film, and the heat resistant porous layer may be formed from an inorganic powder, or may contain a heat resistant resin. By adding a heat resistant resin to the heat resistant porous layer, the heat resistant porous layer can be formed by an easy method such as coating. Examples of the heat resistant resin include polyamide, polyimide, polyamideimide, polycarbonate, polyacetal, polysulfone, polyphenylene sulfide, polyether ketone, aromatic polyester, polyether sulfone and polyether imide, and from the viewpoint of further enhancing heat resistance, preferable are polyamide, polyimide, polyamideimide, polyether sulfone and polyether imide, more preferable are polyamide, polyimide and polyamideimide. Further more preferable are nitrogen-containing aromatic polymers such as aromatic polyamide (para-oriented aromatic polyamide, meta-oriented aromatic polyamide), aromatic polyimide and aromatic polyamideimide, particularly preferable is aromatic polyamide, and from the viewpoint of the production, especially preferable is para-oriented aromatic polyamide (hereinafter sometimes referred to as "para-aramid"). Examples of the heat resistant resin also include poly-4-methylpentene-1 and cyclic olefin-based polymers. By using these heat resistant resins, the heat resistance of a laminated film, that is, the thermal membrane destruction temperature of a laminated film can be further enhanced. In the case of use of a nitrogen-containing aromatic polymer among these heat resistant resins, compatibility with an electrolytic solution, namely, a liquid retaining property on a heat resistant porous layer may also improve, possibly due to polarity in its molecule, and also the rate of impregnation of an electrolytic solution in the production of a nonaqueous electrolyte secondary battery is high, and also the charge and discharge capacity of a nonaqueous electrolyte secondary battery increases further.

The thermal membrane destruction temperature of a laminated film depends on the kind of a heat resistant resin, and is selected according to the use stage and use object. More specifically, the thermal membrane destruction temperature can be controlled to about 400° C. in the case of use of the above-mentioned nitrogen-containing aromatic polymer, to about 250° C. in the case of use of poly-4-methylpentene-1 and to about 300° C. in the case of use of a cyclic olefin-based polymer, as the heat resistant resin, respectively. When the heat resistant porous layer is made of an inorganic powder, it is also possible to control the thermal membrane destruction temperature to, for example, 500° C. or higher.

The above-mentioned para-aramid is obtained by condensation polymerization of a para-oriented aromatic diamine and a para-oriented aromatic dicarboxylic halide, and consists substantially of a repeating unit in which an amide bond is linked at a para-position or a comparable orientation position of an aromatic ring (for example, an orientation position extending coaxially or parallel toward the reverse direction, such as 4,4'-biphenylene, 1,5-naphthalene, or 2,6-naphthalene). Specific examples thereof include para-aramids having a para-orientation type structure or a structure comparable to the para-orientation type, such as poly(para-phenyleneterephthalamide), poly(para-benzamide), poly(4,4'-benzanilide terephthalamide), poly(para-phenylene-4,4'-biphenylene dicarboxylic amide), poly(para-phenylene-2,6-naphthalene dicarboxylic amide), poly(2-chloro-para-phenyleneterephthalamide) and para-phenyleneterephthalamide/2,6-dichloro para-phenyleneterephthalamide copolymer.

As the above-mentioned aromatic polyimide, preferable are wholly aromatic polyimides produced by polycondensation of an aromatic dianhydride and a diamine. Specific examples of the dianhydride include pyromellitic dianhydride, 3,3',4,4'-diphenylsulfone tetracarboxylic dianhydride, 3,3',4,4'-benzophenone tetracarboxylic dianhydride, 2,2'-bis(3,4-dicarboxyphenyl)hexafluoropropane and 3,3',4,4'-biphenyl tetracarboxylic dianhydride. Specific examples of the diamine include oxydianiline, para-phenylenediamine, benzophenonediamine, 3,3'-methylenedianiline, 3,3'-diaminobenzophenone, 3,3'-diaminodiphenylsulfone and 1,5-naphthalenediamine. Further, solvent-soluble polyimides can be suitably used. Examples of such a polyimide include a polyimide which is a polycondensate of 3,3',4,4'-diphenylsulfone tetracarboxylic dianhydride and an aromatic diamine.

Examples of the above-mentioned aromatic polyamideimide include those obtained by using an aromatic dicarboxylic acid and an aromatic diisocyanate and condensation-polymerizing them, and those obtained by using an aromatic dianhydride and an aromatic diisocyanate and condensation-polymerizing them. Specific examples of the aromatic dicarboxylic acid include isophthalic acid and terephthalic acid. Specific examples of the aromatic dianhydride include trimellitic anhydride. Specific examples of the aromatic diisocyanate include 4,4'-diphenylmethane diisocyanate, 2,4-tolylene diisocyanate, 2,6-tolylene diisocyanate, ortho-tolylane diisocyanate and m-xylene diisocyanate.

For further enhancing ion permeability, it is preferable that the thickness of the heat resistant porous layer be thinner, and the thickness is preferably from 1 μm to 10 μm, more preferably from 1 μm to 5 μm and particularly preferably from 1 μm to 4 μm. The heat resistant porous layer has micropores, and the pore size (diameter) is usually 3 μm or less, and preferably 1 μm or less. When the heat resistant porous layer contains a heat resistant resin, the heat resistant porous layer may further contain the fillers described later.

In the above-mentioned laminated film, it is preferable that the porous film have micropores, and have a shutdown function. In this case, the porous film contains a thermoplastic resin. The porous film has a micropore size of usually 3 μm or less, and preferably 1 μm or less. The porous film has a porosity of usually 30 to 80% by volume, preferably 40 to 70% by volume. In the nonaqueous electrolyte secondary battery, in the case the temperature is higher than the usual use temperature, the porous film containing a thermoplastic resin is capable of, obstructing micropores, by softening of the thermoplastic resin constituting the film.

As the above-mentioned thermoplastic resin, those which are insoluble in an electrolytic solution of a nonaqueous electrolyte secondary battery may be advantageously selected. Specific examples thereof include polyolefin resins such as polyethylene and polypropylene, and thermoplastic polyurethane resins, and a mixture of two or more kinds of these compounds may also be used. For softening at lower temperature to attain shutdown, it is preferable that polyethylene be contained. Specific examples of the polyethylene include polyethylenes such as low density polyethylene, high density polyethylene and linear polyethylene, and ultrahigh molecular weight polyethylenes having a molecular weight of 1,000,000 or more. For further enhancing the puncture strength of a porous film, it is preferable that the thermoplastic resin constituting the film contain at least an ultrahigh molecular weight polyethylene. From the viewpoint of the production of a porous film, it is sometimes preferable that the thermoplastic resin contain a wax made of a polyolefin of low molecular weight (a weight average molecular weight of 10,000 or less).

The thickness of a porous film in a laminated film is usually 3 to 30 μm, and more preferably 3 to 25 μm. In the present invention, the thickness of a laminated film is usually 40 μm or less, and preferably 20 μm or less. It is preferable that the value of A/B, where the thickness of a heat resistant porous layer is A (μm) and the thickness of a porous film is B (μm), be from 0.1 to 1.

When a heat resistant porous layer contains a heat resistant resin, the heat resistant porous layer may also contain one or more fillers. The material of the filler may be selected from an organic powder, an inorganic powder and a mixture thereof. It is preferable that particles constituting the filler have an average particle diameter of from 0.01 μm to 1 μm.

Examples of the above-mentioned organic powder include powders made of organic substances such as styrene, vinyl ketone, acrylonitrile, methyl methacrylate, ethyl methacrylate, glycidyl methacrylate, glycidyl acrylate and methyl acrylate, singly or in the form of a copolymer made from two or more kinds of these compounds, and fluorine-containing resins such as polytetrafluoroethylene, ethylene tetrafluoride-propylene hexafluoride copolymer, ethylene tetrafluoride-ethylene copolymer and polyvinylidene fluoride; melamine resins; urea resins; polyolefins; and polymethacrylate. These organic powders may be used alone, or in admixture of two or more kinds. Among these organic powders, a polytetrafluoroethylene powder is preferable from the viewpoint of chemical stability.

Examples of the above-mentioned inorganic powder include powders made of inorganic substances such as metal oxides, metal nitrides, metal carbides, metal hydroxides, carbonates and sulfates. Among them, powders made of inorganic substances of low electric conductivity are preferably used. Specific examples thereof include powders made of alumina, silica, titanium dioxide, calcium carbonate and the like. These inorganic powders may be used alone or in admixture of two or more kinds. Among these inorganic powders, an alumina powder is preferable from the viewpoint of chemical stability. Here, it is more preferable that all particles constituting the filler be alumina particles, and further more preferable is an embodiment in which all particles constituting the filler are alumina particles and part of or all of them are approximately spherical alumina particles. When the heat resistant porous layer is formed from an inorganic powder, the above-exemplified inorganic powders may be advantageously used, and if necessary, a binder may be mixed with them.

The content of a filler when the heat resistant porous layer contains a heat resistant resin depends on the specific gravity of the material of the filler, and for example, when all particles constituting the filler are alumina particles, the weight of the filler is usually from 5 to 95, preferably from 20 to 95 and more preferably from 30 to 90, when the total weight of the heat resistant porous layer is 100. These ranges can be appropriately set according to the specific gravity of the material of the filler.

Examples of the shape of the filler include an approximately spherical shape, a plate shape, a column shape, a needle shape, a whisker shape, and a fiber shape, and any particles can be used, and preferable are approximately spherical particles since uniform pores are formed easily with them. The approximately spherical particles include particles having a particle aspect ratio (particle major axis/particle minor axis) of from 1 to 1.5. The particle aspect ratio can be measured by an electron micrograph.

In the present invention, the separator has an air permeability according to the Gurley method of preferably 50 to 300 sec/100 cc, and more preferably 50 to 200 sec/100 cc, from the viewpoint of the combination with ion permeability. The separator has a porosity of usually 30 to 80% by volume, and preferably 40 to 70% by volume. The separator may also be a laminate of separators having different porosities.

In a secondary battery, the electrolytic solution is usually made of an organic solvent containing an electrolyte. Examples of the electrolyte include lithium salts such as $LiClO_4$, $LiPF_6$, $LiAsF_6$, $LiSbF_6$, $LiBF_4$, $LiCF_3SO_3$, $LiN(SO_2CF_3)_2$, $LiN(SO_2C_2F_5)_2$, $LiN(SO_2CF_3)(COCF_3)$, $Li(C_4F_9SO_3)$, $LiC(SO_2CF_3)_3$, $Li_2B_{10}Cl_{10}$, LiBOB (wherein BOB means bis (oxalato) borate), lower aliphatic carboxylic acid lithium salts and $LiAlCl_4$, and a mixture of two or more kinds of these compounds may also be used. Usually, at least one compound selected from the group consisting of $LiPF_6$, $LiAsF_6$, $LiSbF_6$, $LiBF_4$, $LiCF_3SO_3$, $LiN(SO_2CF_3)_2$ and $LiC(SO_2CF_3)_3$ containing fluorine, among the above-mentioned salts, is used as the lithium salt.

In the above-mentioned electrolytic solution, it is possible to use, as the organic solvent, for example, carbonates such as propylene carbonate, ethylene carbonate, dimethyl carbonate, diethyl carbonate, ethyl methyl carbonate, 4-trifluoromethyl-1,3-dioxolan-2-one and 1,2-di(methoxycarbonyloxy)ethane; ethers such as 1,2-dimethoxyethane, 1,3-dimethoxyprapane, pentafluoropropyl methyl ether, 2,2,3,3-tetrafluoropropyl difluoromethyl ether, tetrahydrofuran and 2-methyltetrahydrofuran; esters such as methyl formate, methyl acetate and γ-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethyl sulfoxide and 1,3-propane sultone, or compounds obtained by further introducing a fluorine substituent into the above-mentioned organic solvents, and usually, two or more kinds of these solvents are used in admixture. Of them, preferable are mixed solvents containing carbonates, and further preferable are mixed solvents of cyclic carbonates and non-cyclic carbonates or mixed solvents of cyclic carbonates and ethers. As the mixed solvents of cyclic carbonates and non-cyclic carbonates, preferable are mixed solvents containing ethylene carbonate, dimethyl carbonate and ethyl methyl carbonate since the operational temperature range is wide, a load property is superior, and difficult degradability is secured even if a graphite material such as natural graphite or artificial graphite is used as the negative electrode active material. Lithium salts containing fluorine such as $LiPF_6$ and organic solvents having a fluorine substituent are preferably used since a particularly superior safety improving effect is obtained. Mixed solvents containing dimethyl carbonate and ethers having a fluorine substituent such as pentafluoropropyl methyl ether and 2,2,3,3-tetrafluoropropyl difluoromethyl ether are further preferable since these are superior also in a large current discharge property.

Instead of the above-mentioned electrolytic solution, a solid electrolyte may be used. As the solid electrolyte, for example, organic polymer electrolytes such as polyethylene oxide-based polymer compounds and polymer compounds containing at least one of a polyorganosiloxane chain and a polyoxyalkylene chain can be used. Further, so-called gel type solutions obtained by allowing a nonaqueous electrolytic solution to be supported on a polymer compound can also be used. Moreover, inorganic solid electrolytes containing a sulfide such as $Li_2S$—$SiS_2$, $Li_2S$—$GeS_2$, $Li_2S$—$P_2S_5$, $Li_2S$—$B_2S_3$, $Li_2S$—$SiS_2$—$Li_3PO_4$ and $Li_2S$—$SiS_2$—$Li_2SO_4$ may also be used. Using these solid electrolytes, safety can be further enhanced. In the nonaqueous electrolyte secondary battery of the present invention, when a solid electrolyte is used, the solid electrolyte sometimes plays a role of a separator. In these cases, sometimes a separator is not necessary.

The present invention will be described in more detail below by way of examples, but the scope of the present invention is not limited to the following examples.

<Measurement of Powder X-Ray Diffraction>

Powder X-ray diffractometry (XRD) was carried out using Ultima IVASC-10 manufactured by Rigaku Corporation. A sample powder was filled on a dedicated substrate, and the measurement was carried out under the conditions of a voltage of 40 kV and a current of 40 mA in the range of diffraction angle $2\theta=10°$ to $90°$, using a CuKα radiation source to obtain a powder X-ray diffraction pattern.

<Measurement of BET Specific Surface Area>

After drying 1 g of a powder in a nitrogen atmosphere at 150° C. for 15 minutes, the measurement was performed using FlowSorb II2300 manufactured by Micrometrics, Inc.

Example 1

In a polypropylene breaker, 71.00 g of potassium hydroxide was added to 930 ml of distilled water and dissolved by stirring, leading to complete dissolution of potassium hydroxide, thereby preparing an aqueous potassium hydroxide solution (aqueous alkali solution). In a glass beaker, to 150 ml of distilled water were added 55.86 g of nickel(II) chloride hexahydrate, 47.50 g of manganese(II) chloride tetrahydrate and 4.97 g of iron(II) chloride tetrahydrate, and these were dissolved by stirring, to obtain an aqueous nickel-manganese-iron mixed solution. While stirring the aqueous potassium hydroxide solution, the aqueous nickel-manganese-iron mixed solution was dropped into this to cause generation of a coprecipitate, thereby obtaining a coprecipitate slurry. The pH of the reaction end point was measured to find a value of 13.

Subsequently, the coprecipitate slurry was subjected to filtration and washing with distilled water to remove an alkali component (KOH) and a by-produced salt component (KCl), and then dried at 120° C. to obtain a dry matter $P_1$. As a result of composition analysis of the dry matter $P_1$, the molar ratio of Ni:Mn:Fe was 0.47:0.48:0.05.

The dry matter ($P_1$) (40.00 g), lithium hydroxide monohydrate (21.66 g) and potassium chloride (12.62 g) were dry-mixed using a ball mill to obtain a raw material mixture $M_1$. After placing 40 g of the raw material mixture $M_1$ in an alumina calcination vessel, air adjusted so that the concentration of carbon dioxide becomes 6% by volume was supplied using an electric tubular furnace at a rate of 1 L/minute. The raw material mixture $M_1$ was held at 800° C. for 3.5 hours and calcined at 950° C. for 1 hour, and then the mixture was cooled down to room temperature to obtain a calcined product. Then, the calcined product was pulverized, washed with distilled water by decantation, and filtrated and dried at 300° C. for 6 hours to obtain a powder $B_1$.

The powder $B_1$ had a BET specific surface area of 8.7 $m^2/g$. As a result of powder X-ray diffractometry, it was found that the crystal structure of the powder $B_1$ was a crystal structure belonging to the R-3m space group.

Example 2

After placing 40 g of the raw material mixture $M_1$ prepared in Example 1 in an alumina calcination vessel, air adjusted so that the concentration of carbon dioxide becomes 6% by volume was supplied using an electric tubular furnace at a rate of 1 L/minute. The raw material mixture $M_1$ was calcined at 950° C. for 1 hour, held at 800° C. for 3.5 hours, and then the mixture was cooled down to room temperature to obtain a calcined product. Then, the calcined product was pulverized, washed with distilled water by decantation, and filtrated and dried at 300° C. for 6 hours to obtain a powder $B_2$.

The powder $B_2$ had a BET specific surface area of 8.2 $m^2/g$. As a result of powder X-ray diffractometry, it was found that the crystal structure of the powder $B_2$ was a crystal structure belonging to the R-3m space group.

Example 3

After placing 40 g of the raw material mixture $M_1$ prepared in Example 1 in an alumina calcination vessel, air adjusted so that the concentration of carbon dioxide becomes 6% by volume was supplied using an electric tubular furnace at a rate of 1 L/minute. The raw material mixture $M_1$ was calcined at 800° C. for 6 hours, and then the mixture was cooled down to room temperature to obtain a calcined product. Then, the calcined product was pulverized, washed with distilled water by decantation, and filtrated and dried at 300° C. for 6 hours to obtain a powder $B_3$.

The powder $B_3$ had a BET specific surface area of 19.8 $m^2/g$. As a result of powder X-ray diffractometry, it was found that the crystal structure of the powder $B_3$ was a crystal structure belonging to the R-3m space group.

Example 4

After placing 40 g of the raw material mixture $M_1$ prepared in Example 1 in an alumina calcination vessel, air adjusted so that the concentration of carbon dioxide becomes 6% by volume was supplied using an electric tubular furnace at a rate of 1 L/minute. The raw material mixture $M_1$ was calcined at 700° C. for 6 hours, and then the mixture was cooled down to room temperature to obtain a calcined product. Then, the calcined product was pulverized, washed with distilled water by decantation, and filtrated and dried at 300° C. for 6 hours to obtain a powder $B_4$.

The powder $B_4$ had a BET specific surface area of 22.4 $m^2/g$. As a result of powder X-ray diffractometry, it was found that the crystal structure of the powder $B_4$ was a crystal structure belonging to the R-3m space group.

Comparative Example 1

After placing 40 g of the raw material mixture $M_1$ prepared in Example 1 in an alumina calcination vessel, air adjusted so that the concentration of carbon dioxide becomes 6% by volume was supplied using an electric tubular furnace at a rate of 1 L/minute. The raw material mixture $M_1$ was calcined at 600° C. for 6 hours, and then the mixture was cooled down to room temperature to obtain a calcined product. Then, the calcined product was pulverized, washed with distilled water by decantation, and filtrated and dried at 300° C. for 6 hours to obtain a powder $B_5$.

The powder $B_5$ had a BET specific surface area of 30.7 $m^2/g$. As a result of powder X-ray diffractometry, it was found that the crystal structure of the powder $B_5$ was a crystal structure belonging to the R-3m space group.

Reference Example 1

After placing 40 g of the raw material mixture $M_1$ prepared in Example 1 in an alumina calcination vessel, air not subjected to adjustment of the concentration of carbon dioxide was supplied using an electric tubular furnace at a rate of 1 L/minute. The raw material mixture $M_1$ was calcined at 800° C. for 6 hours, and then the mixture was cooled down to room temperature to obtain a calcined product. Then, the calcined product was, pulverized, washed with distilled water by decantation, and filtrated and dried at 300° C. for 6 hours to obtain a powder $B_6$.

The powder $B_6$ had a BET specific surface area of 6.4 $m^2/g$. As a result of powder X-ray diffractometry, it was found that the crystal structure of the powder $B_6$ was a crystal structure belonging to the R-3m space group.

Example 5

In a mixing vessel, 100 parts by weight of potassium hydroxide was added to 538 parts by weight of distilled water and dissolved by stirring, leading to complete dissolution of potassium hydroxide, thereby preparing an aqueous potassium hydroxide solution (aqueous alkali solution).

In a separate mixing vessel, 51.5 parts by weight of nickel (II) chloride hexahydrate, 43.9 parts by weight of manganese (II) chloride tetrahydrate and 4.6 parts by weight of iron(II) chloride tetrahydrate were added to 138 parts by weight of distilled water, and these were dissolved by stirring, to obtain an aqueous nickel-manganese-iron mixed solution.

Then, 215 parts by weight of distilled water and 24.7 parts by weight of the aqueous potassium hydroxide solution were charged in a separate mixing vessel, and 165 parts by weight of the aqueous potassium hydroxide solution and 100 parts by weight of the aqueous nickel-manganese-iron mixed solution were added dropwise at a liquid temperature of 30° C. while stirring to form a coprecipitate, and thus obtaining a coprecipitate slurry. The pH of the reaction end point was measured to find a value of 13.

Then, 100 parts by weight of the coprecipitate slurry was filtered through a filter press ("Rollfit Filter Press Dryer", sales origin: Eurotec. Co., Ltd.) under a pressure of 0.4 MPaG at room temperature over 50 minutes, and washed by supplying distilled water under a washing pressure of 0.4 to 0.6 MPaG at room temperature. After washing with water, compression was performed under a compression pressure of 0.7 MPaG for 15 minutes. After evacuating inside the filter press to a pressure of 10 kPa, predrying was performed for 170 minutes by allowing hot water of 90° C. to pass through a jacket of each filtration chamber of the filter press to recover 3.73 parts by weight of a wet cake. At this time, the water content of the wet cake was 13.3% on a wet basis.

The water content on the "wet basis" is a proportion (=weight of water/(weight of water+weight of solid component)×100) calculated by dividing the weight of water contained in the wet cake by the weight of the wet cake (total weight of water and solid component).

The wet cake was dried by a tray dryer at 120° C. and then cracked by a cracking machine to obtain a dry matter $P_2$. As a result of composition analysis of the dry matter $P_2$, the molar ratio of Ni:Mn:Fe was 0.47:0.48:0.05.

The dry matter ($P_2$) (100 parts by weight), lithium carbonate (52.1 parts by weight) and potassium carbonate (14.3 parts by weight) were dry-mixed using a ball mill to obtain a raw material mixture $M_2$. Then, 1.8 kg of the mixture $M_2$ was placed in a calcination vessel made of porous ceramic, and calcined by retaining at 860° C. for 6 hours using a gas calcination furnace (2 $m^3$ shuttle kiln, manufactured by Takasago Industry Co., Ltd.) in which LPG is used as a fuel and flame thereof was introduced into a furnace and used as a heat source. Regarding the atmosphere during calcination, the concentration of oxygen was 11 to 13% by volume and that of carbon dioxide was 6 to 8% by volume.

After completion of the calcination and cooling to room temperature, a calcined product was obtained. The calcined product was pulverized, filtered and washed with distilled water, and then dried at 300° C. for 6 hours to obtain a powder $B_7$.

The powder $B_7$ had a BET specific surface area of 10.4 $m^2/g$. It was found that the crystal structure of the powder $B_7$ was a crystal structure belonging to the R-3m space group.

<Production of Nonaqueous Electrolyte Secondary Battery>

Coin-shaped nonaqueous electrolyte secondary batteries were produced by using the thus obtained powders $B_1$ to $B_7$ as a positive electrode active material, and then a charge and discharge test was carried out.

An N-methyl-2-pyrrolidone (hereinafter sometimes referred to as NMP) solution of PVdF was added as a binder to a mixture of a positive electrode active material (powders $B_1$ to $B_7$) and an electrically conductive material (a mixture of acetylene black and graphite of 9:1 (ratio by weight)) so as to give a composition of active material:electrically conductive material:binder=87:10:3 (ratio by weight), the obtained product was kneaded to yield a paste, the paste was applied to an Al foil having a thickness of 40 µm as a current collector, and vacuum drying was performed at 150° C. for 8 hours, whereby a positive electrode was obtained.

The resultant positive electrode was combined with a solution prepared by dissolving $LiPF_6$ in a concentration of 1 mol/L in a mixed solution of ethylene carbonate (hereinafter sometimes referred to as EC), dimethyl carbonate (hereinafter sometimes referred to as DMC), and ethyl methyl carbonate (hereinafter sometimes referred to as EMC) of a ratio of 30:35:35 (ratio by volume) (hereinafter sometimes referred to as $LiPF_6$/EC+DMC+EMC) as an electrolytic solution, a laminated film as a separator, and metal lithium as a negative electrode, whereby a coin-shaped battery (R2032) was fabricated.

By using the coin-shaped battery, a charge and discharge test was carried out under conditions shown below with the temperature retained at 25° C. The results are shown in Table 1.

<Charge and Discharge Test>

The charge maximum voltage was set to 4.3 V, the charge time was set to 8 hours, and the charge current was set to 0.176 $mA/cm^2$. The discharge minimum voltage in discharging was set to a constant level of 3.0 V, and discharge was carried out while changing the discharge current in each cycle as mentioned below. Higher discharge capacity by discharge in each cycle means higher output.

Discharge at 1st cycle (0.2C): discharge current of 0.176 $mA/cm^2$

Discharge at 2nd cycle (10): discharge current of 0.879 $mA/cm^2$

TABLE 1

| Positive electrode active material | Discharge capacity [mAh/g] 0.2 C | 1 C | 5 C | Calcination conditions | Calcination atmosphere |
|---|---|---|---|---|---|
| Example 1 | $B_1$ | 139 | 123 | 94 | Retention at 800° C. for 3.5 hours and then calcination at 950° C. for 1 hour | Air containing 6% by volume of $CO_2$ |
| Example 2 | $B_2$ | 141 | 124 | 92 | Calcination at 950° C. for 1 hour and then retention at 800° C. for 3.5 hours | |
| Example 3 | $B_3$ | 133 | 122 | 92 | Calcination at 800° C. for 6 hours | |
| Example 4 | $B_4$ | 136 | 123 | 91 | Calcination at 700° C. for 6 hours | |
| Comparative Example 1 | $B_5$ | 124 | 105 | 71 | Calcination at 600° C. for 6 hours | |
| Reference Example 1 | $B_6$ | 132 | 116 | 94 | Calcination at 800° C. for 6 hours | Air |
| Example 5 | $B_7$ | 139 | 120 | 90 | Calcination at 860° C. for 6 hours (gas calcination furnace) | 6 to 8% by volume of $CO_2$ 11 to 13% by volume of $O_2$ |

INDUSTRIAL APPLICABILITY

According to the method of the present invention, it is possible to produce a lithium mixed metal oxide which can be suitably used as a positive electrode active material of a nonaqueous electrolyte secondary battery even in a calcination atmosphere containing higher concentration of carbon dioxide than that in the air. A nonaqueous electrolyte secondary battery using the produced lithium mixed metal oxide as a positive electrode active material is extremely superior in charge and discharge characteristics and becomes remarkably useful.

The invention claimed is:

1. A method for producing a lithium mixed metal oxide, the method comprising:
    mixing a lithium compound, metallic Ni or a compound thereof, and one or more transition metals selected from the group consisting of Mn, Co, Ti, Cr and Fe or a compound thereof to obtain a raw material mixture; and
    calcining the raw material mixture under an atmosphere having a concentration of carbon dioxide of from 1% by volume to 15% by volume at 630° C. or higher,
    wherein the raw material mixture contains a reaction accelerator made of one or more compounds selected from the group consisting of a carbonate, a sulfate and a chloride of one or more elements selected from the group consisting of Na, K, Rb, Cs, Ca, Mg, Sr and Ba.

2. The method for producing a lithium mixed metal oxide according to claim 1, wherein the concentration of oxygen in the calcining step is from 1% by volume to 50% by volume.

3. The method for producing a lithium mixed metal oxide according to claim 1, wherein the calcination time at 630° C. or higher is from 0.5 hours to 24 hours.

4. The method for producing a lithium mixed metal oxide according to claim 1, further comprising:
    a retention step at a temperature which is 30° C. or more lower than a calcination temperature and is 600° C. or higher.

5. The method for producing a lithium mixed metal oxide according to claim 1, wherein the transition metal is Mn and/or Fe.

6. The method for producing a lithium mixed metal oxide according to claim 1, wherein calcination is performed by a gas furnace using flame of a combustion gas as a heat source.

7. The method for producing a lithium mixed metal oxide according to claim 1, wherein the transition metals are Mn and Fe, and the reaction accelerator is a carbonate.

* * * * *